(12) United States Patent
Tan

(10) Patent No.: US 10,303,719 B1
(45) Date of Patent: May 28, 2019

(54) ORGANIZATION AND RETRIEVAL OF CONDITIONED DATA

(71) Applicant: Google Inc., Mountain View, CA (US)

(72) Inventor: Mervyn Yee-Min Tan, Santa Clara, CA (US)

(73) Assignee: Google LLC, Mountain View, CA (US)

(*) Notice: Subject to any disclaimer, the term of this patent is extended or adjusted under 35 U.S.C. 154(b) by 680 days.

(21) Appl. No.: 14/636,761

(22) Filed: Mar. 3, 2015

Related U.S. Application Data

(60) Provisional application No. 61/951,464, filed on Mar. 11, 2014.

(51) Int. Cl.
*G06F 17/30* (2006.01)
*G06F 16/901* (2019.01)
*G06F 16/903* (2019.01)

(52) U.S. Cl.
CPC .... *G06F 16/9024* (2019.01); *G06F 16/90335* (2019.01); *G06F 17/30958* (2013.01); *G06F 17/30979* (2013.01)

(58) Field of Classification Search
CPC .................. G06F 17/30958; G06F 17/30979
See application file for complete search history.

(56) References Cited

U.S. PATENT DOCUMENTS

| | | | | |
|---|---|---|---|---|
| 8,122,016 B1* | 2/2012 | Lamba | ............... | G06F 17/30976 707/723 |
| 8,200,609 B2* | 6/2012 | Crawford | ................ | G06F 8/34 706/59 |
| 2002/0087510 A1* | 7/2002 | Weinberg | ............... | G06F 17/243 |
| 2012/0278321 A1* | 11/2012 | Traub | ................ | G06F 17/30657 707/736 |
| 2013/0173667 A1* | 7/2013 | Soderberg | ............. | G06T 11/206 707/798 |
| 2014/0280144 A1* | 9/2014 | Heit | .................. | G06F 17/30598 707/737 |
| 2016/0026924 A1* | 1/2016 | Amid | ...................... | G06N 5/04 706/12 |

OTHER PUBLICATIONS

Chen et al, Efficient Algorithm for Pattern Matching on Directed Acyclic Graphs, Apr. 18, 2005, IEEE, all pages (Year: 2005).*
Goldstein, et al., "Redundant Bit Vectors for Quickly Searching High-Dimensional Regions," Deterministic and Statistical Methods in Machine Learning Lecture Notes in Computer Science vol. 3635, 2005 (22 pages).

* cited by examiner

*Primary Examiner* — Augustine K. Obisesan
*Assistant Examiner* — Lahcen Ennaji
(74) *Attorney, Agent, or Firm* — Patent Law Works LLP

(57) ABSTRACT

A system and method for organizing and retrieving conditioned data is disclosed. The data retrieval application includes a criteria determination engine, an optimization engine and a retrieval engine. The criteria determination engine determines criteria set for a list of data elements. The optimization engine organizes the list of data elements into a directed acyclic graph embodying a skip list data structure and optimizes the constructed directed acyclic graph. The retrieval engine receives a query, determines the features of the query, queries the directed acyclic graph using the features and retrieves a node representing a user interface data based on the criteria set matching the features.

20 Claims, 9 Drawing Sheets

US 10,303,719 B1

ORGANIZATION AND RETRIEVAL OF CONDITIONED DATA

CROSS REFERENCE TO RELATED APPLICATIONS

The present application claims priority, under 35 U.S.C. § 119, of U.S. Provisional Patent Application No. 61/951,464, filed Mar. 11, 2014 and entitled "Organization and Retrieval of Conditioned Data," which is incorporated by reference in its entirety.

BACKGROUND

The specification relates to organization and retrieval of data conditioned upon multi-dimensional features of a query.

Organizing data for quick and easy retrieval can become complicated. This may be particularly true when the data being organized is conditioned by associated criteria for retrieval and the associated criteria for the data can overlap and intersect. For example, a hash table can be utilized to partition the data based on a subset of dimensions of the associated criteria. The same hash function can be applied to features of a query to determine which hash buckets to search for matching data. This approach may be problematic, however, because it can be biased towards certain dimensions, be storage-intensive and deliver degraded performance because of growing hash buckets.

SUMMARY

According to one innovative aspect of the subject matter described in this disclosure, a system includes a processor and a memory storing instructions that, when executed, cause the system to: determine a list of data elements, determine a first set of criteria associated with a first data element from the list of data elements, identify the first data element as a node in a directed acyclic graph responsive to determining the first set of criteria, determine a second set of criteria associated with a previously inserted data element in the directed acyclic graph, the previously inserted data element being determined in an order of most to least recent insertion into the directed acyclic graph, determine an intersection of the first set of criteria and the second set of criteria, identify the first data element as a neighboring node of the previously inserted data element in the directed acyclic graph responsive to determining the intersection of the first set of criteria and the second set of criteria being non-empty, determine a set difference of the first set of criteria and the second set of criteria, replace the first set of criteria with the set difference and identify the first data element as a root node in the directed acyclic graph responsive to determining the first set of criteria being non-empty.

In general, another innovative aspect of the subject matter described in this disclosure may be implemented in methods that include: determining a list of data elements, determining a first set of criteria associated with a first data element from the list of data elements, identifying the first data element as a node in a directed acyclic graph responsive to determining the first set of criteria, determining a second set of criteria associated with a previously inserted data element in the directed acyclic graph, the previously inserted data element being determined in an order of most to least recent insertion into the directed acyclic graph, determining an intersection of the first set of criteria and the second set of criteria, identifying the first data element as a neighboring node of the previously inserted data element in the directed acyclic graph responsive to determining the intersection of the first set of criteria and the second set of criteria being non-empty, determining a set difference of the first set of criteria and the second set of criteria and replacing the first set of criteria with the set difference, and identifying the first data element as a root node in the directed acyclic graph responsive to determining the first set of criteria being non-empty. Other implementations of one or more of these aspects include corresponding systems, apparatus, and computer programs, configured to perform the actions of the methods, encoded on computer storage devices.

Other aspects include corresponding methods, systems, apparatus, and computer program products." or "Other implementations of one or more of these aspects include corresponding systems, apparatus, and computer programs, configured to perform the actions of the methods, encoded on computer storage devices.

These and other implementations may each optionally include one or more of the following features. For instance, the operation further include identifying a next previously inserted data element in the directed acyclic graph responsive to determining the intersection of the first set of criteria and the second set of criteria being empty. For instance, the operations further include identifying a next data element from the list of data elements responsive to determining the first set of criteria replaced with the set difference being empty. For instance, the operations further include determining that a first node and a second node in the directed acyclic graph are associated with a same data element, combining sets of criteria associated with the first node and the second node into a single set of criteria, and merging a first set of neighboring nodes associated with the first node and a second set of neighboring nodes associated with the second node, the merging preserving a topological ordering of neighboring nodes from the first set and the second set. For instance, the operations further include receiving a query, determining a set of features associated with the query, determining a top list of data elements in a topological order associated with the directed acyclic graph, determining criteria specifying conditions to satisfy associated with a first data element in the top list of data elements, determining an additional condition associated with the first data element, determining whether the set of features matches the criteria specifying conditions associated with the first data element, determining whether the set of features matches the additional condition associated with the first data element, and retrieving the first data element as a result for the query responsive to determining that the set of features matches the criteria and the additional condition associated with the first data element. For instance, the operations further include determining whether data elements in the top list are searched responsive to determining that the set of features does not match the criteria specifying conditions associated with the first data element, identifying a second data element in the top list of data elements responsive to determining that data elements in the top list are not searched, and identifying a bottom list of data elements, the bottom list of data elements including neighboring nodes of the first data element from the top list of data elements and identifying the bottom list of data elements as the top list responsive to determining that data elements in the top list are searched. For instance, the operations further include determining whether data elements in the top list are searched responsive to determining that the set of features does not match the additional condition associated with the first data element, identifying a second data element in top list of data elements responsive to determining that data elements in the top list are not searched, and identify a bottom list of data elements, the bottom list of data elements including neighboring nodes of the first data element from the top list of data elements and identifying the bottom list of data elements as the top list responsive to determining that data elements in the top list are searched.

The features further include the directed acyclic graph embodying a skip list data structure for matching one or more conditions associated with the data element, the additional condition being independent of the set of features associated with the query and the additional condition being dependent on the set of features associated with the query.

The specification describes a data release application that can be particularly advantageous in a number of respects. First, the system can be unbiased towards dimensions of the features of a query. Second, the system accounts for additional conditions associated with data that may be needed to be satisfied for data retrieval. Third, the system functions even when the query has feature values that are unknown. Lastly, the retrieval performance scales with the complexity with which criteria associated with the data intersect in the organized data.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

A system and method for organization and retrieval of data conditioned on the features of a query is described below.

Figure 1:
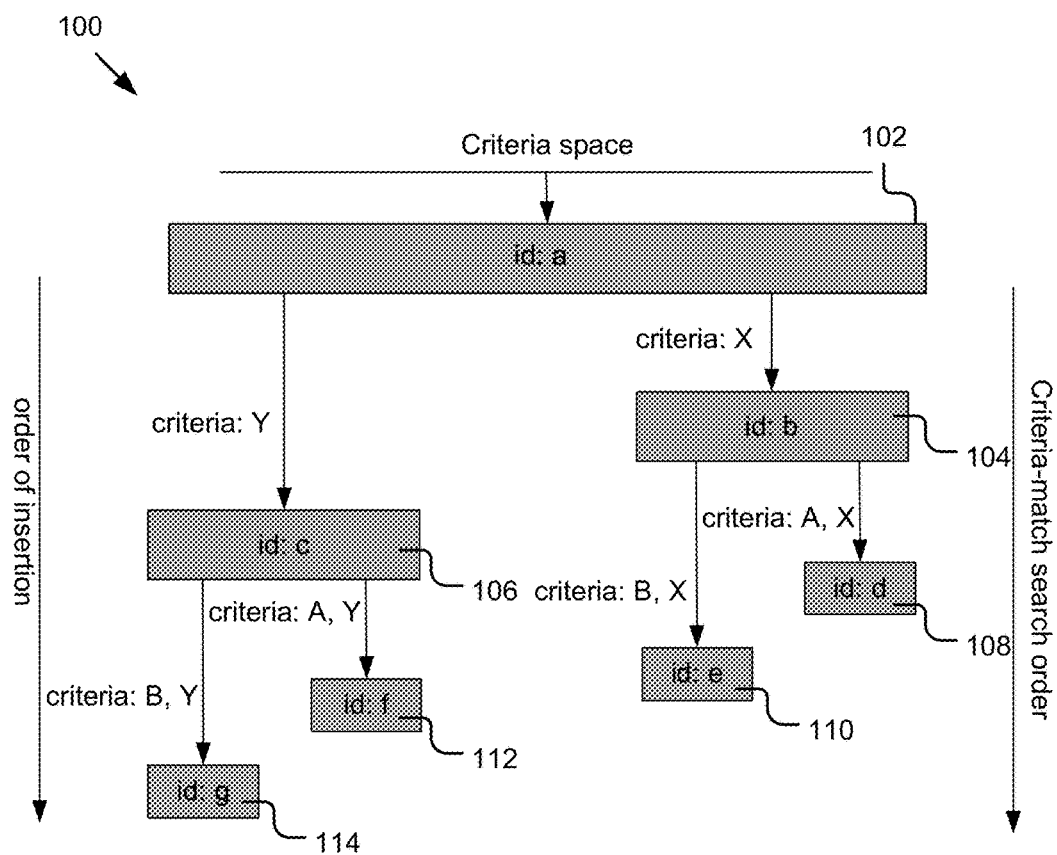
FIG. 1 is a graphic representation of a first example organization of data.

FIG. 1 is a graphic representation 100 of a first example organization of data is illustrated. The graphic representation 100 includes data organization in the graph by criteria refinement. The graphic representation 100 includes the following nodes: node 'a' 102, node 'b' 104, node 'c' 106, node 'd.' 108, node 'e' 110, node 'f' 112, and node 'g' 114. Node 'a' 102 is a default node associated with universal criteria which guarantees an incoming request maps to a node representing data element. In the graphic representation 100, the criteria associated with node 'b' 104 is represented by 'X' and the criteria associated with node 'c' 106 is represented by 'Y'. Further down the graph depth following node 'b' 104, the graphic representation 100 shows that data is further refined by criteria 'A' defining the scope of the node 'd' 108 as {A, X} and by criteria 'B' defining the scope of the node 'e' 110 as {B, X}. Further down the graph depth following node 'c' 106, the graphic representation 100 shows that data is further refined by criteria 'A' defining the scope of the node 'f' 112 as {A, Y} and by criteria 'B' defining the scope of the node 'g' 114 as {B, Y}. The selection of data on the graph occurs with the most-general to most-specific criteria. For example, a query matches node 'd' 108 when the query features first matches the criteria 'X' followed by criteria 'A'.

Figure 2:
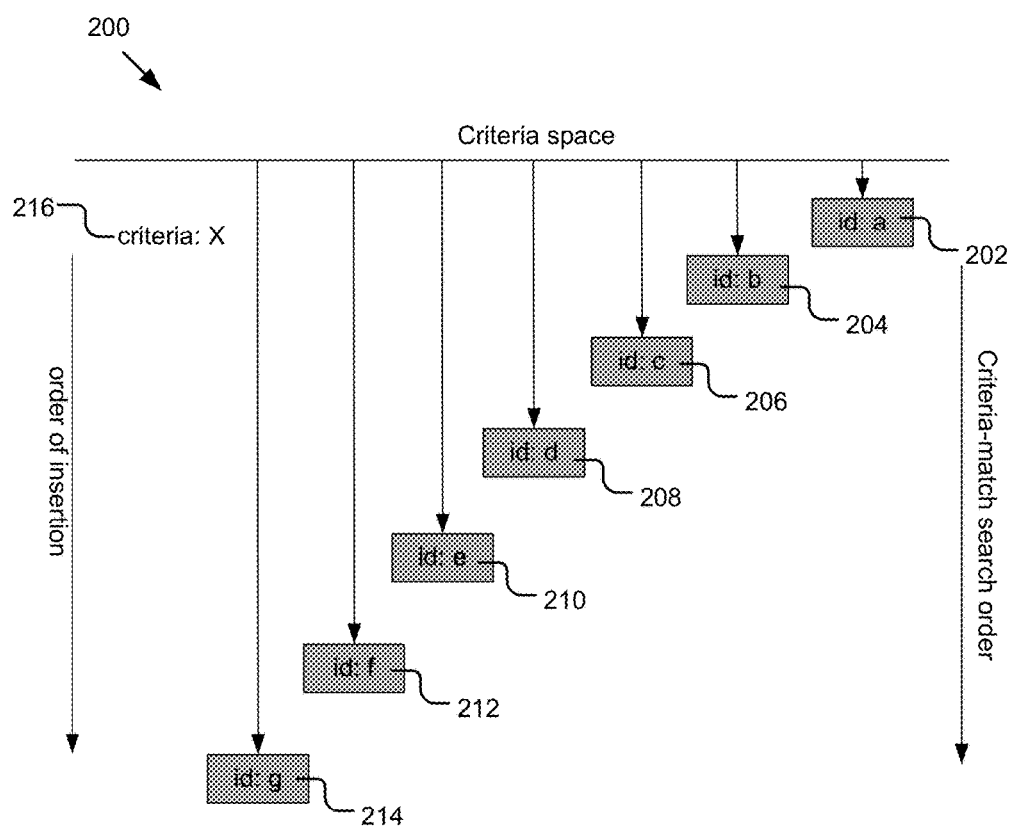
FIG. 2 is a graphic representation of a second example organization of data.

FIG. 2 is a graphic representation 200 of a second example organization of data. The graphic representation 200 includes organization of data sparsely distributed among criteria. The graphic representation 200 includes the following nodes: node 'a' 202, node 'b' 204, node 'c' 206, node 'd' 208, node 'e' 210, node 'f' 212, and node 'g' 214. The criteria associated with each one of the nodes are mutually exclusive across a single dimension 'X' 216.

Figure 3A:
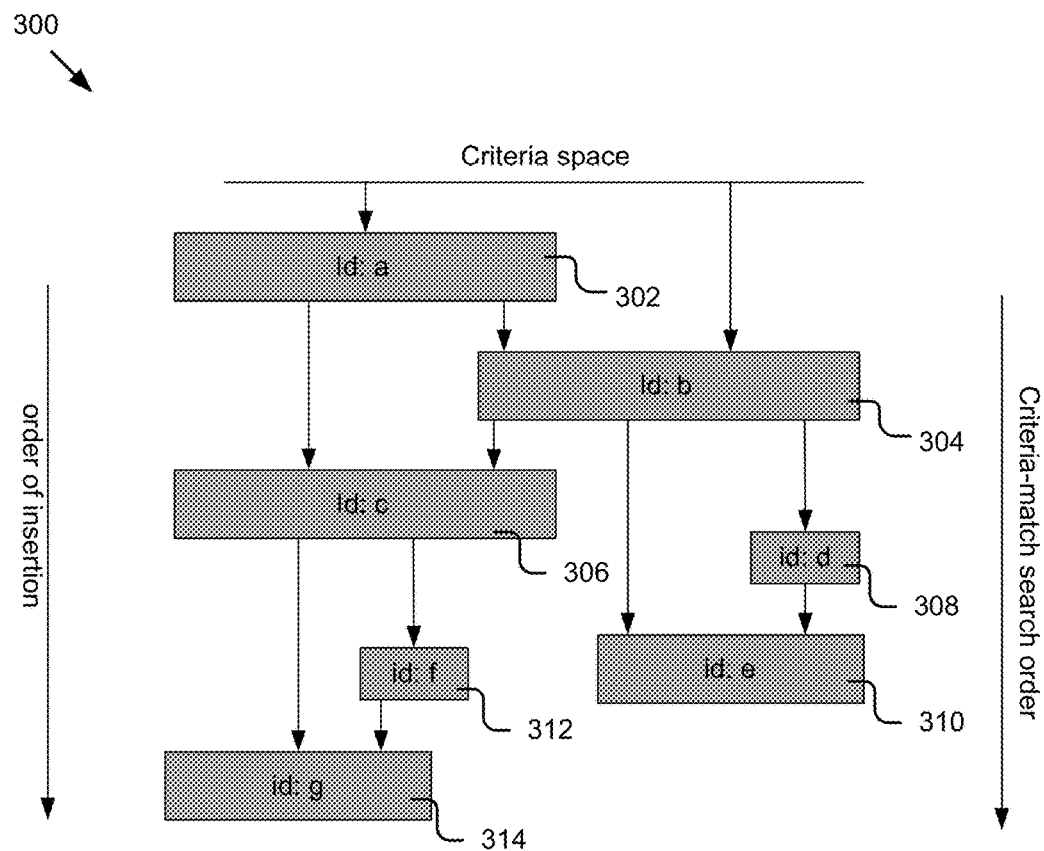
FIG. 3A is a graphic representation of a third example organization of data.

FIG. 3A is a graphic representation 300 of a third example organization of data. The graphic representation 300 includes organization of data in the case where nodes in the graph are associated with criteria that intersect. The graphic representation 500 includes the following nodes: node 'a' 302, node 'b' 304, node 'c' 306, node 'd' 308, node 'e' 310, node 'f' 312, and node 'g' 314. In the illustrated graphic representation 300, node 'a' 302 and node 'd' 308 will not result in a selection because node 'b' 304 and node 'e' 310 take precedence because of their later insertion into the graph.

Figure 3B:
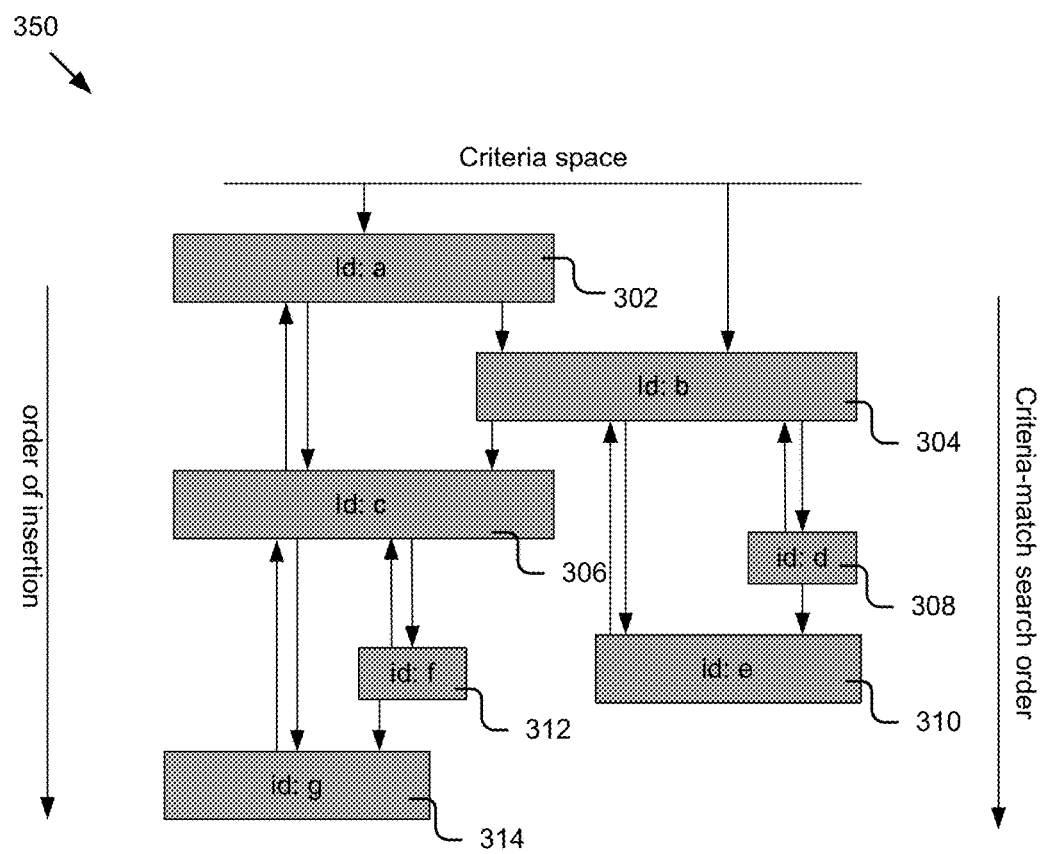
FIG. 3B is a graphic representation of a fourth example organization of data.

FIG. 3B is a graphic representation 350 of a fourth example organization of data. The graphic representation 350 is similar to the graphic representation 300 discussed with reference to FIG. 3A. However, the graphic representation 350 includes backedges. A backedge is a directed edge that points back from a node to the node's parent node if the node's criteria refines the parent node. A node's criteria refines a parent node's criteria if the criteria is a subset of the parent node criteria. More particularly, a node's criteria refines a parent node's criteria if the node's criteria is entirely contained in that of the node's parent node. Thus, the graphic representation 350 includes backedges from the node 'c' 306 to the node 'a' 302, from the node 'g' 314 to the node 'c' 306, from the node 'f' 312 to the node 'c' 306, from the node 'e' 310 to the node 'b' 304, and from the node 'd' 308 to the node 'b' 304. A node can refine at most a single parent node, and the absolute criteria at a node equals the conjunction and of the relative criteria at the node with the absolute criteria of its parent. The graphic representation 350 may be advantageous in enabling criteria associated with a node to be defined relative to that of the node's parent instead of necessarily defining the criteria absolutely. This relative criteria may be simpler and faster to evaluate than an absolute criteria scheme. More particularly, the backedge may provide a way to access the parent's criteria from the child node if the absolute criteria needs to be computed.

Figure 4:
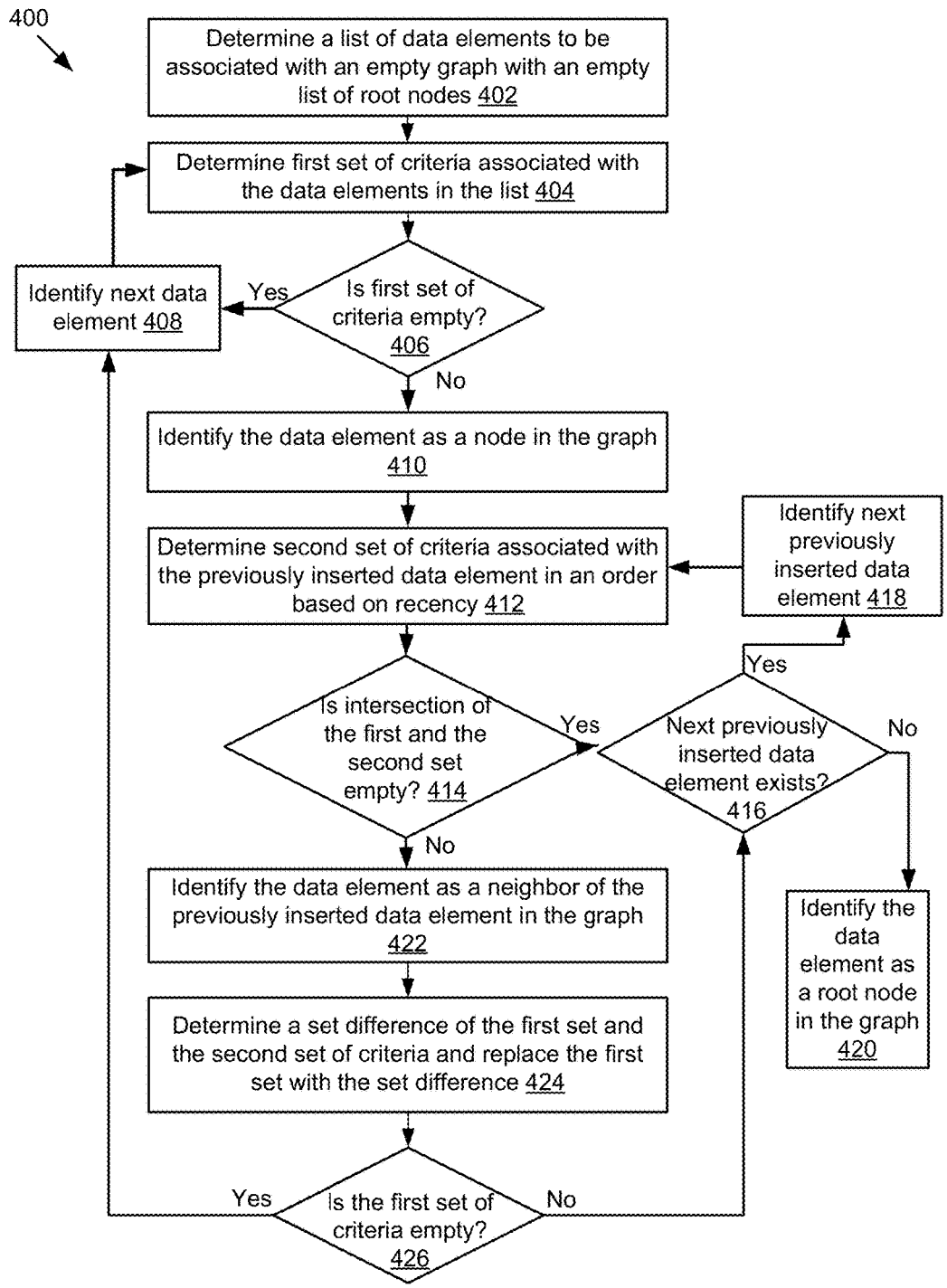
FIG. 4 is a flowchart of an example method for organizing data in a directed acyclic graph.

FIG. 4 is a flowchart 400 of an example method for organizing data in a directed acyclic graph. The data retrieval application 703 includes an optimization engine 806. The optimization engine 806 determines 402 a list of data elements to be associated with an empty graph with an empty list of root nodes. The optimization engine 806 determines 404 first set of criteria associated with the data element in the list and checks 406 whether the first set of criteria is empty. If the first set of criteria is empty, the optimization engine 806 identifies 408 a next data element in the list and repeats the flow from step 404. If the first set is non-empty, the optimization engine 806 identifies 410 the data element as a node in the graph. The optimization engine 806 determines 412 a second set of criteria associated with a previously inserted data element in the graph in an order based on recency. For example, the optimization engine 806 determines the second set of criteria associated with the previously inserted data element in the graph in an order of most to least recent insertion. Then the optimization engine 806 compares 414 the intersection of the first and the second set of criteria to determine if the intersection is empty. If the intersection yields an empty set, the optimization engine 806 checks 416 whether a next previously inserted data element exists. If it exists, the optimization engine 806 identifies 418 the next previously inserted data element and repeats the flow from step 412. If it does not exist, the optimization engine 806 identifies 420 the data element as a root node in the graph. If the intersection yields a non-empty set, the optimization engine 806 identifies 422 the data element as a neighbor of the previously inserted data element in the graph, determines 424 a set difference of the first set and the second set of criteria and replaces the first set of criteria with the set difference. Then the optimization engine 806 checks 426 whether the first set of criteria is empty. If the first set is empty, the optimization engine 806 repeats the flow from step 408. If the first set is non-empty, the optimization engine 806 repeats the flow from step 416.

Figure 5:
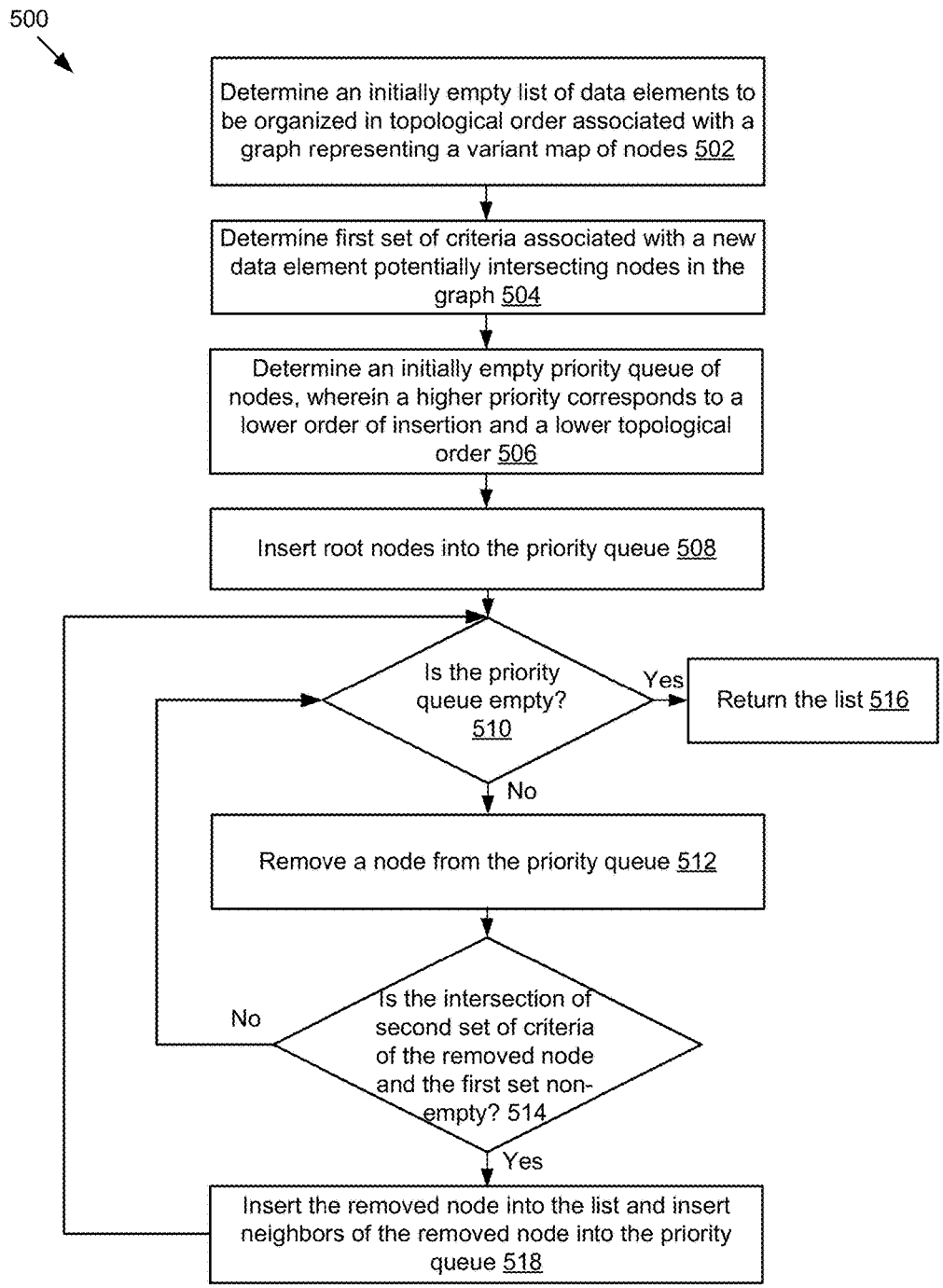
FIG. 5 is a flowchart of an example method for generating a filtered traversal list including data elements intersecting with criteria set of a new data element identified for insertion.

FIG. 5 is a flowchart 500 of an example method for generating a filtered traversal list including data elements intersecting with criteria set of a new data element identified for insertion. The data retrieval application 703 includes an optimization engine 806. The optimization engine 806 determines 502 an initially empty list of data elements to be organized in topological order associated with a graph representing a variant map of nodes. The optimization engine 806 determines 504 a first set of criteria associated with a new data element potentially intersecting nodes in the graph. The optimization engine 806 determines 506 an initially empty priority queue of nodes. A higher priority corresponds to a lower order of insertion (in the directed acyclic graph) and a lower topological order. The optimization engine 806 inserts 508 root nodes into the priority queue. The optimization engine 806 checks 510 whether the priority queue is empty. If the priority queue is not empty, the optimization engine 806 removes 512 a node from the priority queue and checks 514 whether the intersection of the second set of criteria of the removed node and the first set of criteria associated with the new data element is empty. If the intersection is empty, the optimization engine 806 inserts 518 the removed into the list of data elements, inserts neighbors of the removed node into the priority queue and repeats the flow from step 510. If the intersection is not empty, the optimization engine 806 repeats the flow from step 510. If the priority queue is empty, the optimization engine 806 returns 516 the list of data elements.

Figure 6:
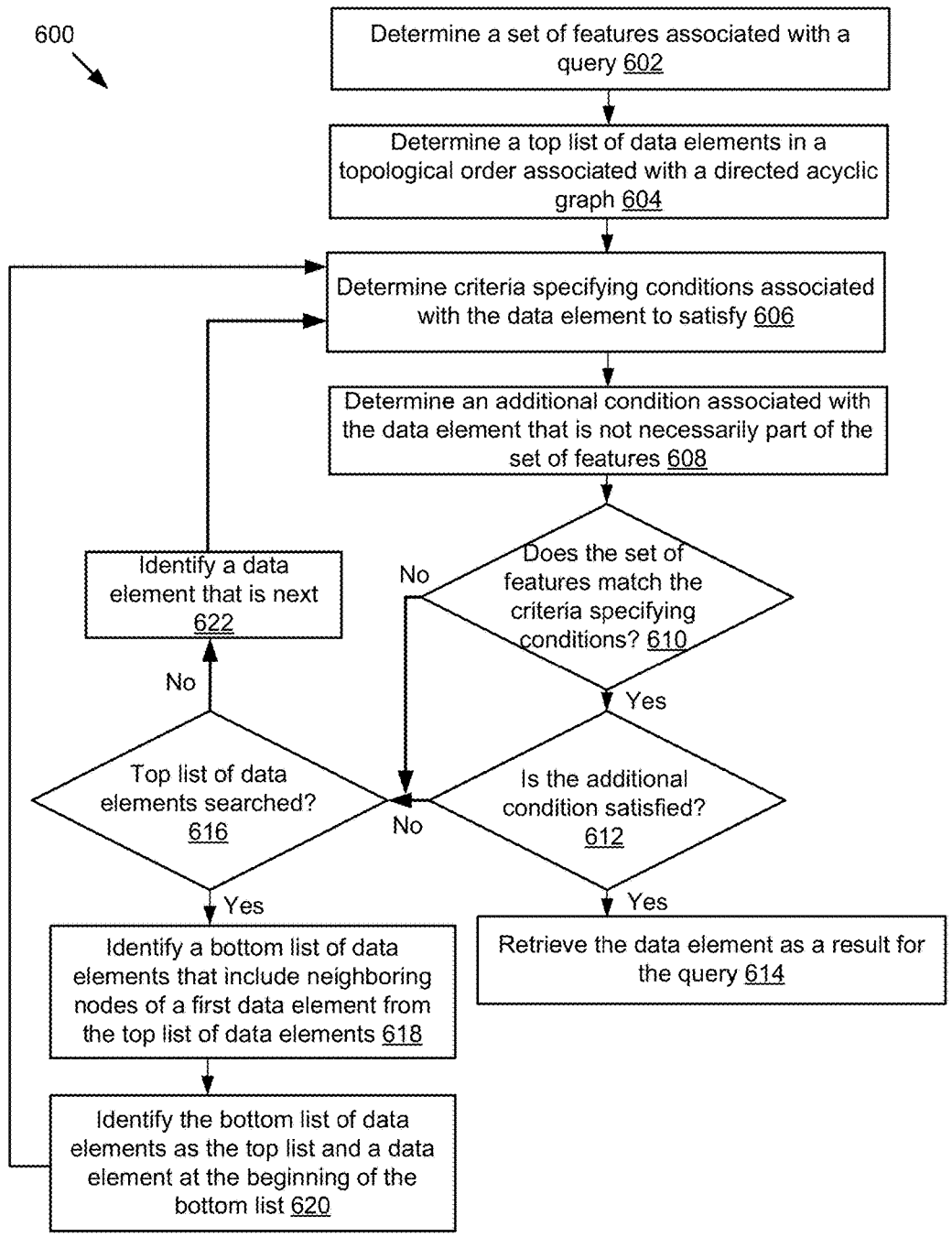
FIG. 6 is a flowchart of an example method for retrieving data from a directed acyclic graph.

FIG. 6 is a flowchart 600 of an example method for retrieving data from a directed acyclic graph. The data retrieval application 703 includes a retrieval engine 808. The retrieval engine 808 determines 602 a set of features associated with a query and determines 604 a top list of data elements in a topological order associated with a directed acyclic graph. The retrieval engine 808 determines 606 criteria specifying conditions associated with the data element in the top list to satisfy and determines 608 an additional condition associated with the data element that is not necessarily part of the set of features. The retrieval engine 808 checks 610 whether the set of features match the criteria specifying conditions. If the set of features match the criteria, the retrieval engine 808 further checks 612 whether the additional condition is also satisfied. If the additional condition has been satisfied, the retrieval engine 808 retrieves 614 the data element as a result for the query. If the set of features do not match the criteria and the additional addition has not been satisfied, the retrieval engine 808 checks 616 whether the top list of data elements has been searched. If the top list has been searched, the retrieval engine 808 identifies 618 a bottom list of data elements that include neighboring nodes of a first data element from the top list of data elements and identifies 620 the bottom list of data elements as the top list and a data element at the beginning of the bottom list and repeats the flow from step 606. If the top list has not been searched, the retrieval engine 808 identifies 622 a data element that is next in the top list and repeats the flow from step 606.

Figure 7:
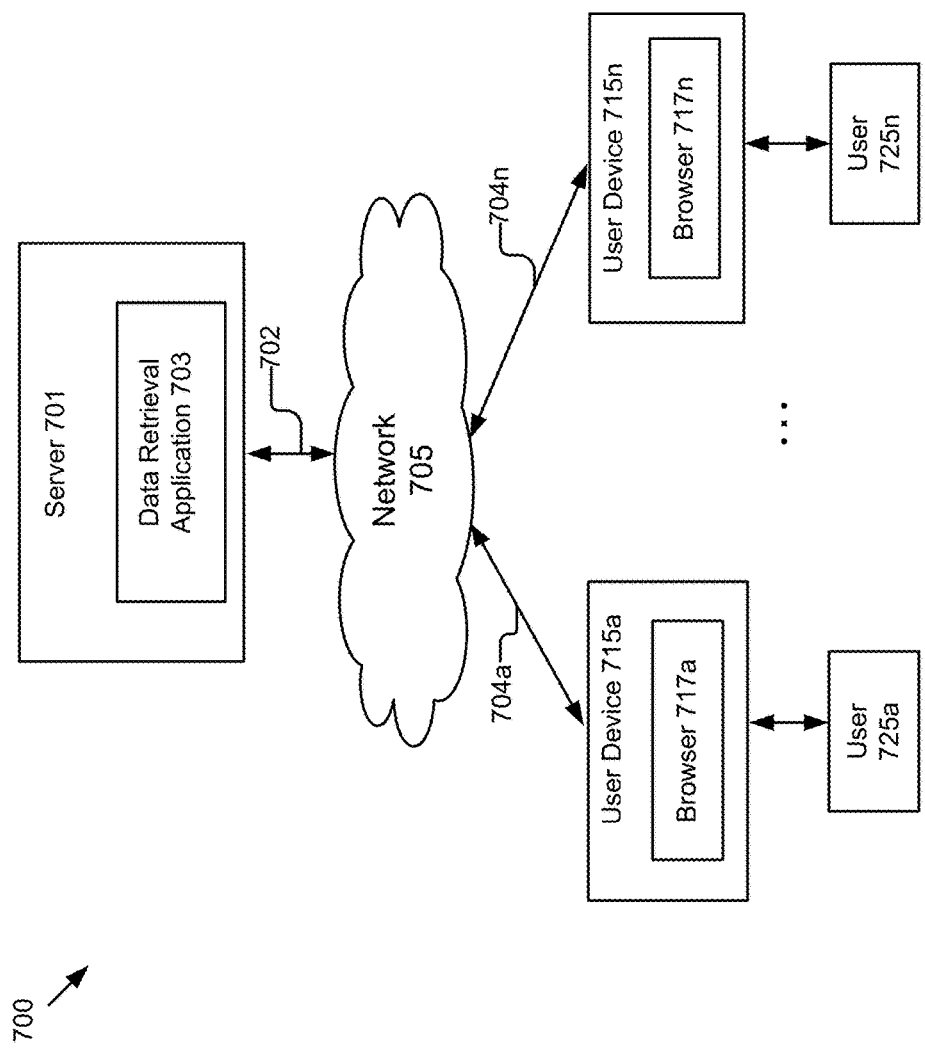
FIG. 7 is a block diagram illustrating an example system for organization and retrieval of data conditioned upon high dimensional query features.

FIG. 7 illustrates a block diagram of a system 700 for organization and retrieval of data according to some implementations. The illustrated description of the example system 700 includes user devices 715*a* . . . 715*n* that can be accessed by users 725*a* . . . 725*n* and a server 701. In the illustrated implementation, these entities of the system 700 are communicatively coupled via a network 705. In FIG. 1 and the remaining figures, a letter after a reference number, for example "715*a*" can be a reference to the element having that particular reference number. A reference number in the text without a following letter, for example "715," can be a general reference to the instances of the element bearing that reference number.

The network 705 can be a conventional type, wired or wireless, and may have a number of configurations, for example, a star configuration, a token ring configuration or other configurations. Furthermore, the network 705 may include one or more of a local area network (LAN), a wide area network (WAN) (e.g., the Internet), and other interconnected data paths across which multiple devices may communicate. In some implementations, the network 705 may be a peer-to-peer network. The network 705 may also be coupled to or include portions of a telecommunications network for sending data in a variety of different communication protocols. In some implementations, the network 705 includes BLUETOOTH® communication networks or a cellular communications network for sending and receiving data, for example, via short messaging service (SMS), multimedia messaging service (MMS), hypertext transfer protocol (HTTP), direct data connection, WAP, electronic message, etc. While only one network 705 is illustrated, any number of networks may be coupled to the above mentioned entities.

The user devices 715*a* . . . 715*n* in FIG. 1 are used by way of example. Although only two devices are illustrated, the technology applies to a system architecture having one or more user devices 715. The user devices 715*a* . . . 715*n* are coupled to the network 705 via signal lines 704*a* . . . 704*n*. The users 725*a* . . . 725*n* interact with the user devices 715*a*-715*n*. The user device 715 can be any computing device that includes a memory and a processor. For example, the user device 715 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 705, etc. The user devices 715*a* . . . 715*n* are adapted to receive user requests, transmit the user requests to the server 701 via the network 705 and display outputs for the users.

In some instances, the user device 715 includes a browser 717. The user 725 inputs requests into the browser 717, for example, by typing on the user device 715. The browser 717 can be software including routines stored in the memory and executed by the processor of the user device 715. The browser 717 includes any browser application that can retrieve pages hosted by a server (for example, the server 701, a social network server (not shown), a third-party server (not shown), etc.) and can present the pages on a display (not shown) on the user device 715a. In some instances, the browser 717 retrieves and presents the pages hosted by the user device 715. The term page includes any document or information resource that has textual elements, non-textual elements (for example, static images, animated images, audio, video, etc.), interactive elements (for example, games, buttons, hyperlinks, etc.), scripts (for example, JavaScript, code implementing Ajax techniques, etc.), metadata, etc. In some instances, the page is a web page in any file format (for example, HTML, HTML5, XHTML, XML, etc.). In some instances, the browser 717 accesses the server 701 using hypertext transfer protocol (HTTP) requests and retrieves content for one or more web pages generated from the server 701.

In some instances, the data retrieval application 703 can be operable on the server 701, which is coupled to the network 705 via signal line 702. The server 701 can be any computing device, for example a hardware server including a processor, a memory and network communication capabilities. The server 701 includes software instructions and/or data for generating a webpage and transmitting the webpage to the user device 715. In some instances, the webpage includes user interface (UI) components that are displayed on the user device 715. An application, for example a browser 717 launched on a user device 715 receives the content transmitted by the server 701 via the network 705. For example, the server 701 transmits content, for example promotional and interactive user interface components (i.e., video, audio, image, animation, games, etc.) commemorating events (for e.g., civil rights movement, nonviolence movement, women's suffrage, etc.), celebrating holidays (for e.g., 4$^{th}$ of July, new year's day, memorial day, etc.) or just intriguing users (for e.g., new product launch promo, interactive game, etc.) on a homepage of a website hosted by the server 701. Although only one server 701 is illustrated, the technology applies to a system architecture dedicated to other functions, business, institutions or organizational structures. A user device 715 can communicate with more than one server 701. For example, a request can be divided and transmitted to multiple servers. Each server 701 performs a specific task within the request. Also, portions of a compound request can be forwarded rather than sending the entire compound request.

The data retrieval application 703 can be software including routines for organizing and retrieval of data. In some implementations, the data retrieval application 703 can be implemented using hardware including a field-programmable gate array (FPGA) or an application-specific integrated circuit (ASIC). In some other implementations, the data retrieval application 703 can be implemented using a combination of hardware and software. In some instances, the data retrieval application 703 may be stored in a combination of the devices and servers, or in one of the devices or servers.

In some instances, the data retrieval application 703 determines criteria set for a list of data elements. The data retrieval application 703 organizes the list of data elements into a directed acyclic graph embodying a skip list data structure. The data retrieval application 703 optimizes the constructed directed acyclic graph. The data retrieval application 703 receives a query, determines the features of the query, and queries the directed acyclic graph using the features. The data retrieval application 703 retrieves a node representing a user interface data from the directed acyclic graph based on the criteria set matching the features. The data retrieval application 703 is described below in more detail with reference to FIG. 2.

Figure 8:
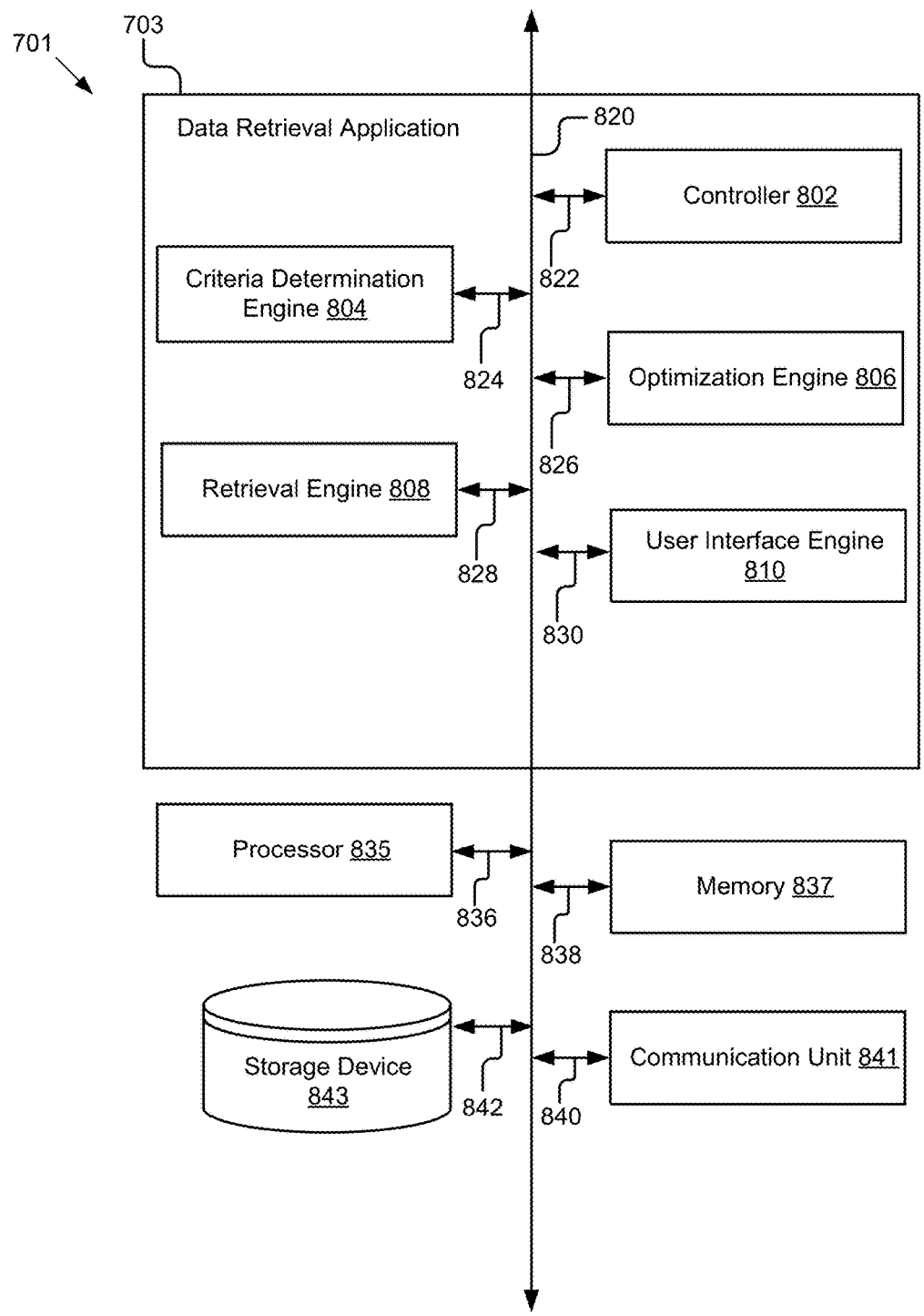
FIG. 8 is a block diagram illustrating an example data retrieval application.

Referring now to FIG. 8, an example of the data retrieval application 703 is shown in detail. FIG. 2 is a block diagram of a server 701 that includes the data retrieval application 703, a processor 835, a memory 837, a communication unit 841 and a storage device 843 according to some implementations. These components of the computing device 701 are communicatively coupled to each other by a bus 820.

The processor 835 includes an arithmetic logic unit, a microprocessor, a general purpose controller or some other processor array to perform computations and provide electronic display signals to a display device. The processor 835 is coupled to the bus 820 for communication with the other components via signal line 836. The processor 835 processes data signals and may include various computing architectures including a complex instruction set computer (CISC) architecture, a reduced instruction set computer (RISC) architecture, or an architecture implementing a combination of instruction sets. Although a single processor is shown in FIG. 2, multiple processors may be included. The processing capability may be limited to supporting querying for data, processing and transmission of data, and rendering of a user interface based on the data. The processing capability might be enough to perform more complex tasks, including various types of feature extraction and sampling. Other processors, operating systems, sensors, displays and physical configurations may be possible.

The memory 837 stores instructions and/or data that may be executed by the processor 835. The memory 837 is coupled to the bus 820 for communication with the other components via signal line 838. The instructions and/or data may include code for performing the techniques described herein. The memory 837 may be a dynamic random access memory (DRAM) device, a static random access memory (SRAM) device, flash memory or some other memory device known in the art. In some instances, the memory 837 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device for storing data on a more permanent basis.

The communication unit 841 transmits and receives data to and from one or more of the user devices 715. The communication unit 841 is coupled to the bus 820 via signal line 840. In some instances, the communication unit 841 includes a port for direct physical connection to the network 705 or to another communication channel. For example, the communication unit 841 includes a USB, SD, CAT-5 or similar port for wired communication with the user device 715. In some other instances, the communication unit 841 includes a wireless transceiver for exchanging data with the user device 715 or other communication channel using one or more wireless communication methods, for example IEEE 802.11, IEEE 802.16, BLUETOOTH® or another suitable wireless communication method.

In some instances, the communication unit 841 includes a cellular communications transceiver for sending and receiving data over a cellular communications network, for example, via short messaging service (SMS), multimedia messaging service (MMS), hypertext transfer protocol (HTTP), direct data connection, WAP, electronic message or another suitable type of electronic communication. In some instances, the communication unit 841 includes a wired port and a wireless transceiver. The communication unit 841 also provides other conventional connections to the network 705 for distribution of one or more files and media objects using standard network protocols, for example, TCP/IP, HTTP, HTTPS and SMTP.

The storage device 843 can be a non-transitory memory that stores data used by the data retrieval application 703. In some instances the data is stored temporarily, for example, in a cache. The storage device 843 may be a dynamic random access memory (DRAM) device, a static random access memory (SRAM) device, flash memory or some other memory device known in the art. In some instances, the storage device 843 also includes a non-volatile memory or similar permanent storage device and media such as a hard disk drive, a CD-ROM device, a DVD-ROM device, a DVD-RAM device, a DVD-RW device, a flash memory device, or some other mass storage device known for storing information on a more permanent basis. In the illustrated implementation, the storage device 843 is communicatively coupled by the bus 820 for communication with the other components of the server 701 via signal line 842. Although only one storage device is shown in FIG. 2, multiple storage devices may be included. In some other instances, the storage device 843 may not be included in the server 701 and can be communicatively coupled to the server 701 via the network 705.

In some instances, the storage device 843 stores the list of data elements and a data structure organizing the list of data elements. For example, a directed acyclic graph data structure. In some other instances, the storage device 843 stores criteria sets for the list of data elements. In some instances, the storage device 843 stores the features of incoming queries. In some other instances, the storage device 843 stores a filtered traversal list for graph construction. In some instances, the storage device 843 stores a dictionary of embedded directed acyclic graphs. The storage device 843 may store other data for providing the functionality described herein.

In some instances, the data retrieval application 703 includes a controller 802, a criteria determination engine 804, an optimization engine 806, a retrieval engine 808 and a user interface engine 810. These components of the data retrieval application 703 are communicatively coupled to each other via the bus 820.

The controller 802 can be software including routines for receiving data via the communication unit 841, routing the data to the appropriate engine or unit and transmitting responses from the engine or unit to the communication unit 841 for transmission to the user device 715. In some instances, the controller 802 can be a set of instructions executable by the processor 835 to provide the functionality described below for managing data. In some other instances, the controller 802 can be stored in the memory 837 of the server 701 and can be accessible and executable by the processor 835. In either of the instances, the controller 802 may be adapted for cooperation and communication with the processor 835 and other components of the server 701 via signal line 822.

In some instances, the controller 802 identifies the type of data being received and transmits the data to the appropriate component or engine of the data retrieval application 703. In some other instances, the controller 802 receives user inputs and user actions submitted by the user 725 from the user device 715. The controller 802 sends the user actions and the user inputs to the appropriate engine or unit of the data retrieval application 703. For example, the controller 802 receives a request from a user for a web page and forwards the request to the retrieval engine 808.

In some instances, the controller 802 receives information from other components of the data retrieval application 703 and transmits the information to the appropriate component in the system 700 via the communication unit 841. For example, the controller 802 receives graphical data for generating a user interface from the user interface engine 810. The controller 802 then transmits the graphical data to a display device (not shown) that is part of the user device 715. The graphical data causes the user device 715 to present the user interface to the user.

In some instances, the controller 802 receives data from components of the data retrieval application 703 and stores the data in the storage device 843. For example, the controller 802 receives criteria associated with data elements from the criteria determination engine 804 and stores them in the storage device 843. In some other instances, the controller 802 retrieves data from the storage device 843 and sends the data to other components of the data retrieval application 703. For example, the controller 802 retrieves a topologically ordered list of data elements of a directed acyclic graph constructed based on the criteria of the data elements from the storage device 843 and transmits them to the retrieval engine 808 for determining matches for a user query.

The criteria determination engine 804 can be software including routines for determining criteria associated with one or more data elements. In some instances, the criteria determination engine 804 can be a set of instructions executable by the processor 835 to provide the functionality described below for determining criteria. In some other instances, the criteria determination engine 804 can be stored in the memory 837 of the server 701 and can be accessible and executable by the processor 835. In either of the instances, the criteria determination engine 804 can be adapted for cooperation and communication with the processor 835, the controller 802, the optimization engine 806 and other components of the data retrieval application 703 via signal line 824.

In some instances, the criteria determination engine 804 retrieves a data element from the storage device 843 and associates criteria for the retrieved data element. The data element (also denoted as a variant) can be, for example, a user interface element including an animation, a video, an interactive game, etc. rendered on a web page in response to a user request. In another example, the data element also stores information including color, font, formatting, language, link text, uniform resource locators (URL) and ordering of components generated in different programming languages (e.g., cascading style sheets (CSS), JavaScript (JS), etc.) used for delivering a user interface experience. In some instances, the criteria determination engine 804 determines criteria in order to associate with the retrieved data element in the storage device 843. For example, the criteria associated with a "Valentine's Day" animation may get matched against features of a HyperText Transfer Protocol (HTTP) query in order for the animation to become visible on the web page.

In some instances, the criteria determination engine 804 determines criteria based on possible requests from one or more users. The criteria can be multi-dimensional set of values or an empty set. The criteria that span the space of requests can be called universal criteria set. For example, the criteria determination engine 804 determines criteria values that span across one or more dimensions including a country of origin based on IP address, a browser type, a display language, user sign-in/sign-off, etc. that may have to be satisfied for making a "4$^{th}$ of July" banner to become visible on a homepage of a website hosted by the server 701. In another example, the criteria determination engine 804 determines criteria values across other dimensions including user age group, domain origin, browser type, browser plug-in for rendering a richer user experience, display language, etc. that may be satisfied for a new product promotional video to be displayed on the homepage of a website to intrigue visitors.

In some instances, the criteria determination engine 804 determines a partial ordering of criteria for a data element. For example, an interactive multimedia banner commemorating "Bastille Day" can first be associated with domain criteria value (for e.g., "www.xyz-biz.ca," "www.xyx-biz.fr," etc.), followed by display language criteria value (for e.g., English, French, etc.), browser type value (for e.g., HTML5 supported, multimedia plug-in supported, etc.), user sign-in value (for e.g., sign in/sign out), etc. In some instances, the criteria determination engine 804 determines an additional condition for associating with a data element. In some instances, the additional condition can be dependent on the characteristics or features of an incoming query, for example, HTTP query. In some other instances, the additional condition can be independent of the features of an incoming query.

In some instances, the criteria determination engine 804 stores the criteria associated with the one or more data elements indexed against the identifiers of the one or more data elements in storage device 843. In some other instances, the criteria determination engine 804 transmits the criteria to the optimization engine 806 for generating a directed acyclic graph data structure.

The optimization engine 806 can be software including routines for organizing and optimizing data in a data structure. In some instances, the optimization engine 806 can be a set of instructions executable by the processor 835 to provide the functionality described below for organizing and optimizing data in a data structure. In some other instances, the optimization engine 806 can be stored in the memory 837 of the server 701 and can be accessible and executable by the processor 835. In either of the instances, the optimization engine 806 can be adapted for cooperation and communication with the processor 835, the retrieval engine 808 and other components of the data retrieval application 703 via signal line 826.

In some instances, the optimization engine 806 retrieves a list of data elements or variants from the storage device 843 and organizes the variants in a directed acyclic graph data structure. The directed acyclic graph data structure implements a skip list with the variants representing the nodes of the skip list. A node in the directed acyclic graph (also defined as variant tree) uniquely represents a data element and edges out of the node touch the nearest neighboring nodes in the directed acyclic graph. In some instances, a node 'P' is defined as a nearest neighbor node of a node 'Q' if and only if (i) node 'P' has a higher index than node 'Q' in the list, (ii) the intersection of sets of criteria of node 'P' and node 'Q' is non-empty, and (iii) the criteria associated with the nodes (for e.g., node 'R') between node 'P' and node 'Q' do not completely cover the intersection of the sets of criteria of node 'P' and node 'Q'. For example, the nearest neighbor definition can be formally stated as:

(Index(P)>Index (Q))AND (P.criteria∩Q.criteria !={ })
AND NOT ((P.criteria ∩Q.criteria)⊆Union(R.criteria: Index(P)>Index(R)>Index(Q))

In some instances, the optimization engine 806 organizes data by determining a list of data elements to associate with an empty directed acyclic graph data structure. The directed acyclic graph starts with an empty list of root nodes. In some instances, the optimization engine 806 generates and constructs the directed acyclic graph iteratively. The optimization engine 806 starts off the graph construction with a first data element in the list of data elements. In each outer iteration of graph construction, the optimization engine 806 determines a first set of criteria associated with every subsequent data element in the list and checks whether the set is empty or non-empty. If the set is empty, the optimization engine 806 identifies the data element as not being conditioned for retrieval and determines a first set of criteria for the next data element in the list. For example, a graphic logo user interface (UI) data element may not be conditioned on any criteria for appearing on the web page of a multinational company.

If the set is non-empty, the optimization engine 806 identifies the data element as a node in the directed acyclic graph. Then the optimization engine 806 enters an inner iteration nested within the outer iteration of the graph construction. The optimization engine 806 determines a second set of criteria associated with a previously inserted data element (as a node) in the directed acyclic graph. In some instances, the inner iteration of previously inserted data elements follows an order of most to least recent insertion into the directed acyclic graph. The optimization engine 806 checks whether an intersection of the first and the second set of criteria yields an empty set. If the intersection yields a non-empty set, the optimization engine 806 identifies the data element as a neighboring node of the previously inserted data element in the directed acyclic graph, determines a set difference of the first set and the second set of criteria and replaces the first set of criteria with the set difference.

If the intersection yields an empty set, the optimization engine 806 determines a next previously inserted data element for the next iteration in the inner iteration. If the next previously inserted data element exists, the optimization engine 806 identifies the next previously inserted data element in the directed acyclic graph and determines the second set of criteria for the next previously inserted data element. If the next previously inserted data element does not exist, the optimization engine 806 exits the inner iteration and the outer iteration of the graph construction and identifies the data element as a root node in the directed acyclic graph.

The optimization engine 806 checks whether the first set of criteria (replaced with the set difference in the previous paragraph) is an empty set. If the set is empty, the optimization engine 806 identifies a next data element in the list and moves to the next iteration in the outer iteration of the graph construction. If the set is non-empty, the optimization engine 806 determines whether a next previously inserted data element exists in the directed acyclic graph and moves to the next iteration in the inner iteration of the graph construction. The time complexity or performance of the graph construction described above can be measured to be O($N^2$) for N data elements to be inserted into the directed acyclic graph.

In some instances, the optimization engine 806 determines a partial ordering among criteria associated with a data element or variant. A partial ordering among criteria associated with the data element may suggest that the data element is hierarchical in scope and can be defined as "well behaved" data. The graph construction algorithm described above follows a "bottom-up" insertion approach into the directed acyclic graph. The "bottom-up" insertion approach potentially requires traversing a large number of data elements that may be part of entire sub-graphs in the directed acyclic graph because a new data element identified for insertion may not have its criteria set intersect with that of the entire sub-graphs.

In some instances, the optimization engine 806 inserts data elements into the directed cyclic graph using a "top-down" insertion approach that takes advantage of the partial ordering among criteria associated with the new data element. In some instances, the optimization engine 806 generates a filtered list of data elements identifying the criteria set of the filtered list as intersecting with the criteria associated with that of the new element identified for insertion into the directed acyclic graph. In some instances, the optimization engine 806 determines an initially empty list of data elements from the directed acyclic graph. The list of data elements can represent nodes intersecting with a first set of criteria identified for a new data element to be inserted into the directed acyclic graph. The optimization engine 806 determines the first set of criteria associated with the new data element that may be potentially intersecting with one or more nodes in the directed acyclic graph. The optimization engine 806 determines an initially empty priority queue of unique nodes and inserts root nodes of the directed acyclic graph into the priority queue. A higher priority corresponds to a lower order of insertion into the directed acyclic graph and a lower topological order. In some instances, the optimization engine 806 generates the filtered list iteratively until the priority queue is found empty. In each iteration, the optimization engine 806 checks whether the priority queue is empty. If the priority queue is not empty, the optimization engine 806 removes a node from the top of the priority queue. The optimization engine 806 determines a second set of criteria identified for the removed node and checks whether the intersection of the first and the second set of criteria is non-empty. If the intersection is non-empty, the optimization engine 806 inserts the removed node into the list of data elements (that was initially empty), inserts the neighboring nodes of the removed node identified from the directed acyclic graph into the priority queue and then checks again whether the priority queue is empty. If the intersection is empty, the optimization engine 806 checks again whether the priority queue is empty. If the priority queue is found empty in one of the above two instances, the optimization engine 806 exits the iteration and provides the list of data elements. In some instances, the list of data elements can be provided as filtered and in a topological order. In some instances, the filtered list of data elements generated may be of the size O (log N) for N existing data elements when the data elements including the new data element can be defined as being well-behaved. In some other instances, the time complexity involved in generating the filtered list can be measured as O (N) for N nodes of the directed acyclic graph in the worst-case scenario but O (log N) if the N nodes are being identified as well-behaved data including the new node identified for insertion.

In some instances, the optimization engine 806 uses the filtered list of data elements as a traversing set in the inner iteration of the graph construction algorithm described above. The use of the filtered list improves the time complexity in executing the graph construction from O (N) to O (log N) for partially ordered N data elements being defined as well-behaved.

In some instances, the optimization engine 806 generates a directed acyclic graph that forgoes mutual exclusivity for criteria in the data elements identified for insertion. In some instances, the data element inserted later in the directed acyclic graph takes precedence over the data element inserted earlier. This allows for incremental construction of the directed acyclic graph that implements a skip list data structure. For example, a first user interface (UI) component including descriptions for an animated video of a product launch for display on a web page can be inserted into the directed acyclic graph data structure with a set of criteria associated with the first UI component. A second UI component including updated descriptions for the animated video can be inserted later into the directed acyclic graph data structure as a descendant of the first UI component. The first and the second UI component's criteria set does not require to be mutually exclusive of each other.

In some instances, the optimization engine 806 optimizes the organization of data in the directed acyclic graph by merging two or more data elements or nodes associated with the same data or values and having common properties. For example, a node 'S' with a single ancestor 'T' and associated with same data as node 'T' can be merged in the directed acyclic graph. In some instances, optimization engine 806 performs merging by a union operation on the sets of criteria associated with the two or more nodes and merging the neighboring nodes of the two or more nodes in the directed acyclic graph. The merging of the neighboring nodes preserves the topological ordering in the directed acyclic graph.

In some instances, the optimization engine 806 converts the directed acyclic graph into the original representation of an ordered list of data elements. For example, a directed acyclic graph 'G' when converted into an ordered list returns a list 'V' representing a topological ordering of all nodes in the graph, a list "D.neighbors" representing neighboring nodes in a topological order for each node 'D' of the graph and a list 'R' representing all the root nodes in a topological ordering from the graph.

In some instances, the optimization engine 806 generates a dictionary of embedded directed acyclic graphs. The dictionary includes a plurality of directed acyclic graphs or variant trees in a hierarchical structure. The optimization engine 806 generates a dictionary where a key corresponds to a name of a feature variable in the one or more queries and its associated directed acyclic graph includes data elements or variants of the variable's value. In some other instances, the optimization engine 806 receives a request to blacklist one or more data elements in a directed acyclic graph by their indices and blacklists the data elements in the directed acyclic graph. Once blacklisted, the data elements or variants cannot be selected in response to an incoming query.

In some instances, the optimization engine 806 stores the directed acyclic graph or the variant tree, dictionary and the filtered list for traversal in the storage device 843. In some other instances, the optimization engine 806 transmits the directed acyclic graph to the retrieval engine 808 for matching against a user query to retrieve the matched data element.

In some instances, the optimization engine 806 may union nodes in the directed acyclic graph while preserving behavior. For example, in a vertical optimization, a node 'Q' may be merged with a parent node 'P' if 'P' and 'Q' share a common value, and other parent nodes of 'Q' are topologically ordered less than 'P'. In a horizontal optimization, sibling nodes 'Q' of a parent node 'P' may be merged if 'Q' nodes share a common value, and 'Q' nodes have adjacent topological orderings in the parent node's skip list. When two nodes are merged, their criteria may merged as well as their skip list and/or outbound edges. The outbound edges of the parents of the individual nodes to be merged would need to be updated to point to the new merged node. The primary benefit of this extension is that the size of the data structure is reduced while maintaining the same behavior. This improves storage and performance characteristics of the algorithms involving the data structure.

In some instances, a process may iterate through nodes in topological order. For each node 'N' in an iteration, the outbound edges may be known to children nodes of the node 'N'. Children nodes of the node 'N' may be updated with back edges to the node 'N'. In some instances, a separate data structure 'D' local to the process may be used to store this information. The node 'N' may be merged with parent node 'P' of the node 'N' if 'P' and 'N' nodes share a common value, and other parent nodes of 'N' are topologically ordered less than 'P'.

In some instances, a process may iterate through nodes in topological order. For each node 'N' in an iteration, the node 'N' may be updated to be the union of nodes in an equivalence class if the node 'N' is the first encountered in the equivalence class. If the node 'N' is not the first encountered equivalence class the node 'N' may be removed.

The retrieval engine 808 can be software including routines for retrieving a data element matching features of a query from the directed acyclic graph. In some instances, the retrieval engine 808 can be a set of instructions executable by the processor 835 to provide the functionality described below for retrieving data elements from the directed acyclic graph. In some other instances, the retrieval engine 808 can be stored in the memory 837 of the server 701 and can be accessible and executable by the processor 835. In either of the instances, the retrieval engine 808 can be adapted for cooperation and communication with the processor 835, the optimization engine 806 and other components of the data retrieval application 703 via signal line 828.

In some instances, the retrieval engine 808 receives a query and determines query features by parsing the query. For example, the query features can include multi-dimensional features in one or more of a display language, a domain, a country of origin based on the internet protocol (IP) address, etc. In some instances, the retrieval engine 808 retrieves the directed acyclic graph from the storage device 843 for querying the directed acyclic graph for retrieving a data element. For example, the retrieval engine 808 queries the graph with the display language identified as a feature in the user query to retrieve a matching link text as a UI element. The edges in the directed acyclic graph pointing to the nodes of the directed acyclic graph include associated scope that can be modeled as a Boolean expression over the potential query features. The space of true values as determined from the Boolean expression can be modeled as the criteria of the corresponding nodes in the directed acyclic graph.

In some instances, the retrieval engine 808 retrieves a data element as a result in response to a query by determining a set of features associated with the query. The retrieval engine 808 also determines a top list of data elements or nodes associated with the directed acyclic graph storing the data elements. The directed acyclic graph data structure implements a skip list for condition matching. For example, the top list can be a topological ordering of root nodes. In some instances, the retrieval engine 808 resolves to a single node based on the characteristics or features of the query in an iterative fashion. A data element in the graph matches a query if the set of features corresponding to the query is a subset of the set of criteria associated with the data element. In each iteration of data retrieval, the retrieval engine 808 determines the criteria specifying conditions associated with every subsequent data element in the top list of data elements. In some instances, the retrieval engine 808 determines an additional condition that can be associated with the data element. The additional condition can be dependent or independent of the features of the query. The retrieval engine 808 checks whether the set of features of the query match the criteria specifying conditions of the data element. If there is a match, the retrieval engine 808 further determines whether the additional condition associated with the data element is satisfied. The retrieval engine 808 retrieves the data element as a result for the query in response to the additional condition being satisfied and exits the iteration. If there is no match and the additional condition is not satisfied, the retrieval engine 808 checks to determine whether the top list of the skip list is now completely searched. If the top list is not completely searched, the retrieval engine 808 identifies a data element that is next in the top list and moves to the next iteration. If the top list is completely searched and no match is found, the retrieval engine 808 identifies a bottom list of the skip list. The bottom list includes the neighboring nodes of a first data element from the top list. The retrieval engine 808 identifies the bottom list of the skip list now as the top list. The retrieval engine 808 then identifies a data element at the beginning of the bottom list and moves to the next iteration.

In some instances, the time complexity involved in retrieving a data element from the directed acyclic graph ranges from O (1) to O (N) for N data elements identified for traversing in the directed acyclic graph. For example, O (1) can be measured as retrieval performance for unconditioned data elements and O (N) can be measured as retrieval performance for N data elements where criteria for all N data elements intersect with the features of the query. In some instances, the time complexity for retrieving a data element can be O (log N) if the N data elements are organized into a partial ordering or defined to be "well-behaved".

In some instances, the retrieval engine 808 stores the retrieved data element or variant matching the user query in the storage device 843. In some other instances, the retrieval engine 808 transmits the retrieval result to the user interface engine 810 for displaying the user interface components on web pages.

The user interface engine 810 can be software including routines for generating graphical data providing user interface components in response to receiving a query from a browser 717. In some instances, the user interface engine 810 can be a set of instructions executable by the processor 835 to provide the functionality described below for generating graphical data. In some other instances, the user interface engine 810 can be stored in the memory 837 of the server 701 and can be accessible and executable by the processor 835. In either of the instances, the user interface engine 810 can be adapted for cooperation and communication with the processor 835, the optimization engine 806, the retrieval engine 808 and other components of the data retrieval application 703 via signal line 830.

In some instances, the user interface engine 810 receives instructions from the retrieval engine 808 to generate graphical data for displaying on a web page that includes link text, uniform resource locators (URL), and UI components (for e.g., interactive game, video, image, animations, etc.) in different color, font, format and order. The user interface engine 810 sends the graphical data to an application (e.g., a browser 717) in the user device 715 via the communication unit 841 causing the application to display the data in a user interface.

Reference in the specification to "some instances" or "an instance" means that a particular feature, structure, or characteristic described in connection with the instance is included in at least some instances of the description. The appearances of the phrase "in some instances" in various places in the specification are not necessarily all referring to the same instance.

Some portions of the detailed descriptions that follow are presented in terms of algorithms and symbolic representations of operations on data bits within a computer memory. These algorithmic descriptions and representations are the means generally used in the data processing arts to most effectively convey the substance of a work to others. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be implemented in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
determining, using one or more computing devices, a list of data elements;
determining, using the one or more computing devices, a first set of criteria associated with a first data element from the list of data elements;
identifying, using the one or more computing devices, the first data element as a node in a directed acyclic graph responsive to determining the first set of criteria;
determining, using the one or more computing devices, a second set of criteria associated with a previously inserted data element in the directed acyclic graph, the previously inserted data element being determined in an order based on recency;
comparing, using the one or more computing devices, an intersection of the first set of criteria and the second set of criteria;
responsive to determining the intersection of the first set of criteria and the second set of criteria being non-empty, identifying the first data element as a neighboring node of the previously inserted data element in the directed acyclic graph;
receiving a query; and
retrieving a result for the query using a data structure of the directed acyclic graph, wherein the result for the query is unbiased towards a first set of dimensions associated with a set of features associated with the query.

2. The method of claim 1, wherein determining the second set of criteria associated with the previously inserted data element in the order is from most to least recent insertion into the directed acyclic graph.

3. The method of claim 1, further comprising:
determining, using the one or more computing devices, a set difference of the first set of criteria and the second set of criteria and replacing the first set of criteria with the set difference; and
responsive to determining the first set of criteria are non-empty, identifying the first data element as a root node in the directed acyclic graph.

4. The method of claim 1, further comprising:
determining a set difference of the first set of criteria and the second set of criteria and replacing the first set of criteria with the set difference; and
responsive to determining the intersection of the first set of criteria and the second set of criteria are empty, identifying a next previously inserted data element in the directed acyclic graph.

5. The method of claim 1, further comprising:
determining a set difference of the first set of criteria and the second set of criteria and replacing the first set of criteria with the set difference; and
responsive to determining the first set of criteria replaced with the set difference are empty, identifying a next data element from the list of data elements.

6. The method of claim 1, further comprising:
determining that a first node and a second node in the directed acyclic graph are associated with a same data element;
combining sets of criteria associated with the first node and the second node into a single set of criteria; and
merging a first set of neighboring nodes associated with the first node and a second set of neighboring nodes associated with the second node, the merging preserving a topological ordering of neighboring nodes from the first set of neighboring nodes and the second set of neighboring nodes.

7. The method of claim 1, further comprising:
determining the set of features associated with the query;
determining a top list of data elements in a topological order associated with the directed acyclic graph;
determining criteria specifying conditions to satisfy associated with a first data element in the top list of data elements;
determining an additional condition associated with the first data element;
determining whether the set of features matches the criteria specifying conditions associated with the first data element;
determining whether the set of features matches the additional condition associated with the first data element; and
wherein, responsive to determining that the set of features matches the criteria and the additional condition associated with the first data element, the first data element is retrieved as a portion of the result for the query.

8. The method of claim 7, further comprising:
responsive to determining that the set of features does not match the criteria specifying conditions associated with the first data element, determining whether data elements in the top list of data elements are searched;
responsive to determining that data elements in the top list of data elements are not searched, identifying a second data element in the top list of data elements; and
responsive to determining that data elements in the top list of data elements are searched:
identifying a bottom list of data elements, the bottom list of data elements including neighboring nodes of the first data element from the top list of data elements; and
setting the bottom list of data elements as the top list of data elements prior to iterating.

9. The method of claim 7, further comprising:
responsive to determining that the set of features does not match the additional condition associated with the first data element, determining whether data elements in the top list of data elements are searched;
responsive to determining that data elements in the top list of data elements are not searched, identifying a second data element in top list of data elements; and
responsive to determining that data elements in the top list of data elements are searched:
identifying a bottom list of data elements, the bottom list of data elements including neighboring nodes of the first data element from the top list of data elements; and
setting the bottom list of data elements as the top list of data elements prior to iterating.

10. The method of claim 7, wherein the additional condition is independent of the set of features associated with the query.

11. The method of claim 7, wherein the additional condition is dependent on the set of features associated with the query.

12. The method of claim 7, wherein the directed acyclic graph implements a skip list data structure for matching one or more conditions associated with the first data element.

13. A system comprising:
one or more processors, the one or more processors being configured to:
determine a list of data elements;
determine a first set of criteria associated with a first data element from the list of data elements;
identify the first data element as a node in a directed acyclic graph responsive to determining the first set of criteria;
determine a second set of criteria associated with a previously inserted data element in the directed acyclic graph, the previously inserted data element being determined in an order based on recency;
compare an intersection of the first set of criteria and the second set of criteria;
identify the first data element as a neighboring node of the previously inserted data element in the directed acyclic graph responsive to determining the intersection of the first set of criteria and the second set of criteria being non-empty;
receive a query; and
retrieve a result for the query using a data structure of the directed acyclic graph, wherein the result for the query is unbiased towards a first set of dimensions associated with a set of features associated with the query.

14. The system of claim 13, wherein determining the second set of criteria associated with the previously inserted data element in the order is from most to least recent insertion into the directed acyclic graph.

15. The system of claim 13, wherein the one or more processors are further configured to:
determine a set difference of the first set of criteria and the second set of criteria and replacing the first set of criteria with the set difference; and
responsive to determining the first set of criteria are non-empty, identifying the first data element as a root node in the directed acyclic graph.

16. The system of claim 13, wherein the one or more processors are further configured to:
determine a set difference of the first set of criteria and the second set of criteria and replacing the first set of criteria with the set difference; and
identify a next previously inserted data element in the directed acyclic graph responsive to determining the intersection of the first set of criteria and the second set of criteria are empty.

17. The system of claim 13, wherein the one or more processors further configured to:
determine a set difference of the first set of criteria and the second set of criteria and replacing the first set of criteria with the set difference; and
identify a next data element from the list of data elements responsive to determining the first set of criteria replaced with the set difference being empty.

18. The system of claim 13, wherein the one or more processors further configured to:
determine the set of features associated with the query;
determine a top list of data elements in a topological order associated with the directed acyclic graph;
determine criteria specifying conditions to satisfy associated with a first data element in the top list of data elements;
determine an additional condition associated with the first data element;
determine whether the set of features matches the criteria specifying conditions to satisfy associated with the first data element;
determine whether the set of features matches the additional condition associated with the first data element; and
wherein the first data element is retrieved as a portion of the result for the query, the first data element retrieved responsive to determining that the set of features matches the criteria specifying conditions to satisfy associated with the first data element and the additional condition associated with the first data element.

19. A computer program product comprising a non-transitory computer usable medium including a computer readable program, wherein the computer readable program when executed on a computer causes the computer to perform steps comprising:
determining a list of data elements;
determining a first set of criteria associated with a first data element from the list of data elements;
identifying the first data element as a node in a directed acyclic graph responsive to determining the first set of criteria;
determining a second set of criteria associated with a previously inserted data element in the directed acyclic graph, the previously inserted data element being determined in an order based on recency;
compare an intersection of the first set of criteria and the second set of criteria;
responsive to determining the intersection of the first set of criteria and the second set of criteria being non-empty, identifying the first data element as a neighboring node of the previously inserted data element in the directed acyclic graph;
receiving a query; and
retrieving a result for the query using a data structure of the directed acyclic graph, wherein the result for the query is unbiased towards a first set of dimensions associated with a set of features associated with the query.

20. The computer program product of claim 19, wherein determining the second set of criteria associated with the previously inserted data element in the order is from most to least recent insertion into the directed acyclic graph.

* * * * *